Sept. 15, 1925.

O. R. BLATTER

STORAGE BATTERY

Filed Oct. 28, 1922 5 Sheets-Sheet 3

1,553,742

WITNESS

INVENTOR
O. R. Blatter,
BY
ATTORNEYS

Sept. 15, 1925.
O. R. BLATTER
STORAGE BATTERY
Filed Oct. 28, 1922     5 Sheets-Sheet 4
1,553,742
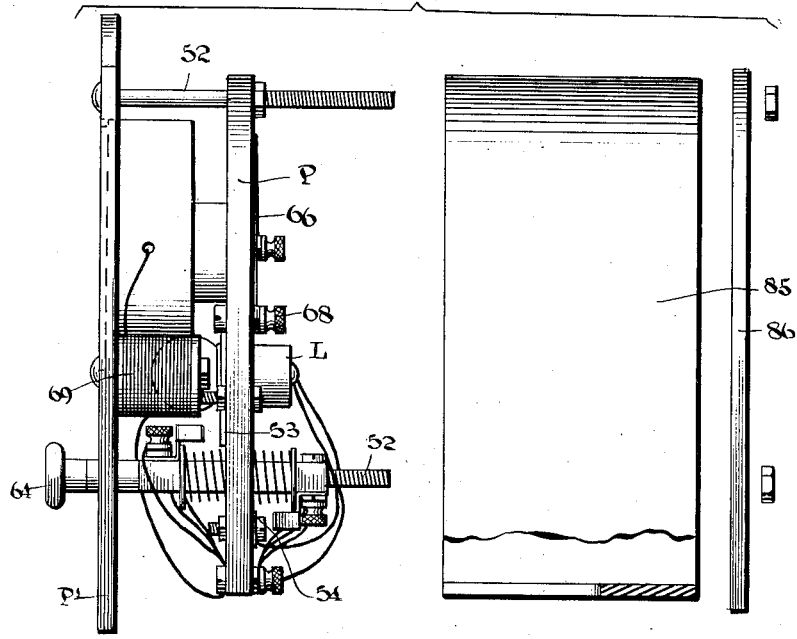
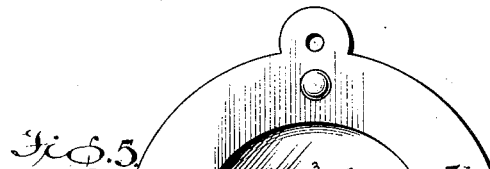
WITNESS
INVENTOR
O. R. Blatter,
BY
ATTORNEYS Sept. 15, 1925.     O. R. BLATTER     1,553,742
STORAGE BATTERY
Filed Oct. 28, 1922     5 Sheets-Sheet 5
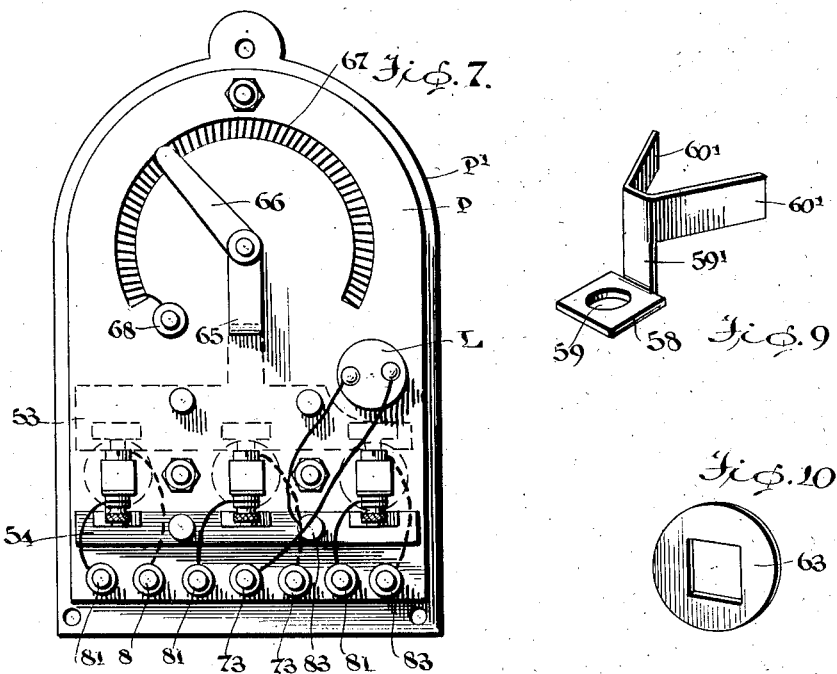
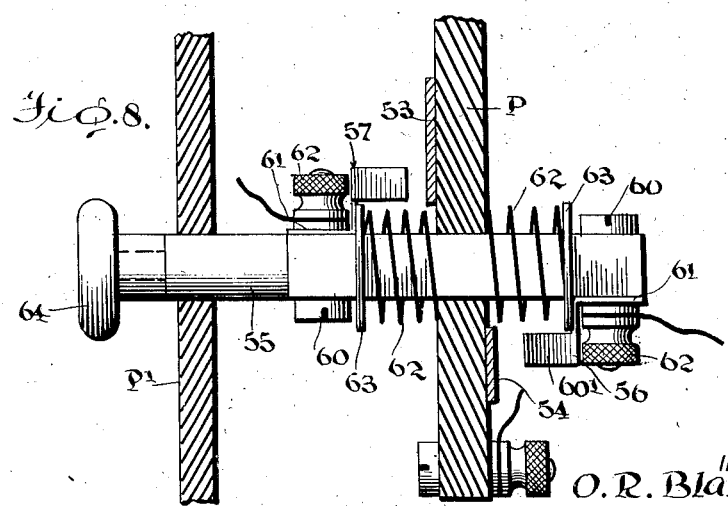

Patented Sept. 15, 1925.

1,553,742

UNITED STATES PATENT OFFICE.

OSCAR R. BLATTER, OF ALBION, NEBRASKA.

STORAGE BATTERY.

Application filed October 28, 1922. Serial No. 597,639.

*To all whom it may concern:*

Be it known that I, OSCAR R. BLATTER, a citizen of the United States, and a resident of Albion, in the county of Boone and State of Nebraska, have invented certain new and useful Improvements in Storage Batteries, of which the following is a specification.

This invention relates to storage batteries.

The present invention more particularly relates to storage batteries of the electrolytic type and has for its object to provide means whereby the voltage of each cell of a storage battery may be indicated at a remote point.

It is also an object of the invention that means be provided whereby the exact height of electrolyte in each cell of a storage battery may be indicated at a remote point.

A further object of the invention is that the means employed for indicating both the height of electrolyte and the voltage of cells of a storage battery be accurate and reliable.

A still further object of the invention is that the indicating means heretofore referred to may be associated or incorporated in the structure of an ordinary storage battery without greatly changing the design and construction thereof.

A still further and important object of the invention is that the indicating means be of such a nature that they may be associated with a storage battery on a motor vehicle whereby to indicate both the height of electrolyte and the voltage of each cell of a storage battery at a position in view of the operator of the motor vehicle.

Other objects, and objects relating to details of construction, combination and arrangement of parts will hereinafter appear in the detailed description to follow.

In carrying out the invention it is contemplated to employ two float members, one of which is immersed within the electrolyte of a storage battery, and the other carried or riding upon the electrolyte of the storage battery. With the first named member there is associated means whereby the exact voltage of the storage battery cell within which the same may be disposed may be indicated at a remote point, and with the other member means are associated whereby the approximate height of electrolyte within a cell of the storage battery with which the member may be associated may be ascertained at a remote point. The means for operating the electrolyte indicating means and also the means for operating the voltage indicating means are in each instance electrical and the current for operating said means is supplied from the battery being tested.

The invention is illustrated by way of example in the accompanying drawings, in which:—

Figure 5 is a front elevation of an ammeter employed in connection with the present invention.

Figure 6 is a group view in side elevation further illustrating the construction of the ammeter.

Figure 7 is a rear elevation of the ammeter.

Figure 8 is a detailed sectional view illustrating the switch or push button employed for operating both the electrolyte level indicating means and the cell voltage indicating means.

Figure 9 is a detailed perspective view of one of the contact members associated with the switch means shown in Figure 8.

Figure 10 is a similar view of a washer used in connection with the construction of the switch shown in Figure 8.

Figure 11 is a perspective view of a rack or frame employed for tilting the battery to adjust the initial height of electrolyte.

Figure 12 is a detailed view showing in part the construction of the tube for enclosing the member employed for operating the cell voltage indicating means and illustrating the manner in which the same may be tilted for obtaining the proper amount of electrolyte therein.

Like reference numerals refer to like parts throughout the drawings.

Figure 3:
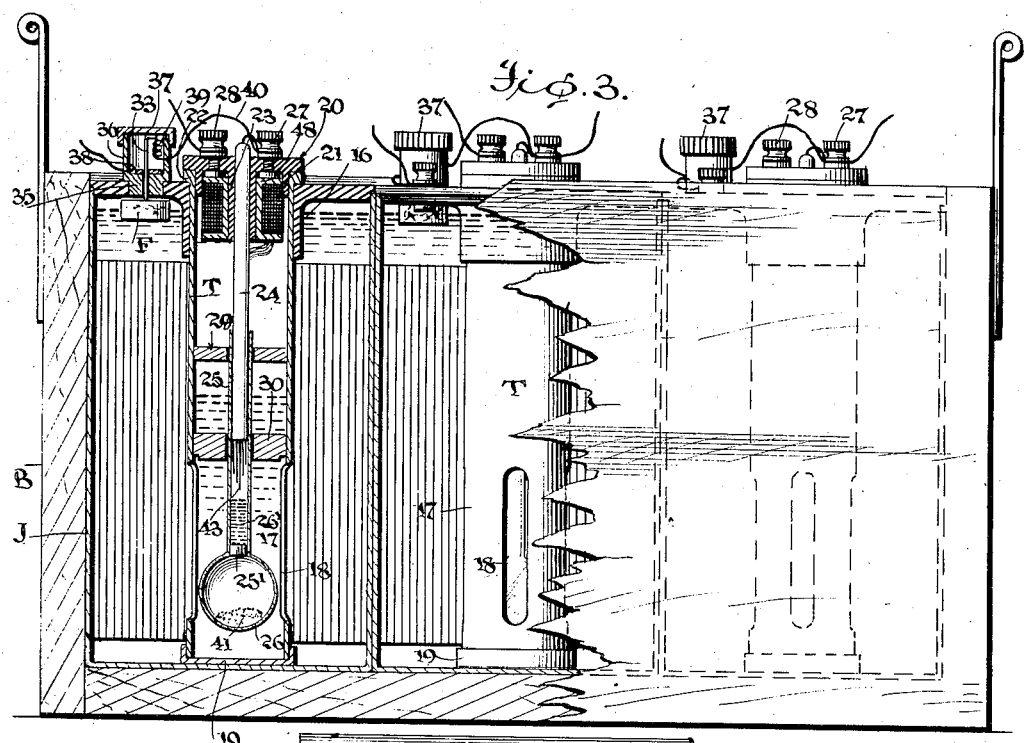
Figure 3 is a view in side elevation of the same with the parts broken away and shown in section to illustrate the application of the invention.
Figure 4:
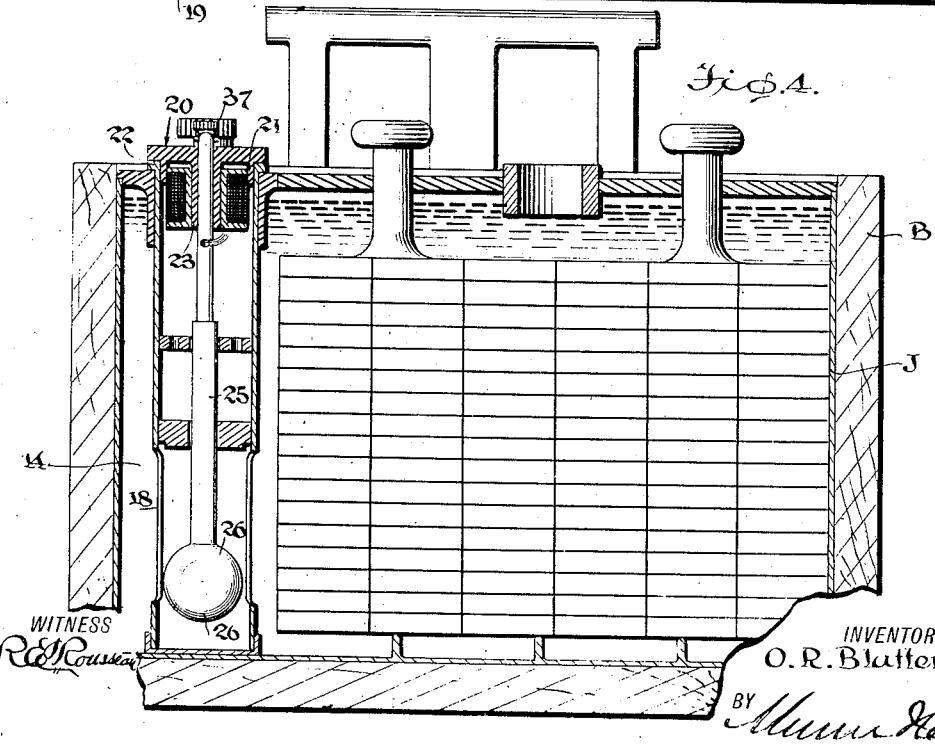
Figure 4 is a view taken at right angles to Figure 3 of a battery with which the present invention is incorporated.

Referring to the drawings more particularly, B indicates generally a battery box or casing which may be of the usual construction and in which there is positioned a plurality of battery jars J, each jar being of hard rubber, or the like, and in the present instance, said jars being three in number. The battery disclosed in the present drawings is of the six volt type such as commonly employed on motor vehicles. Each jar J is provided with the usual cover 10, and in each jar there is positioned the usual number of negative and positive plates properly insulated from one another as shown in Figures 3 and 4. The positive plates of the different cells are connected together and brought to the lug or terminal post 11, while the negative cells are brought to the terminal post 12; and each cover 10 is provided with a suitable opening 13 in which electrolyte may be injected into the cell therebeneath.

Figure 2:
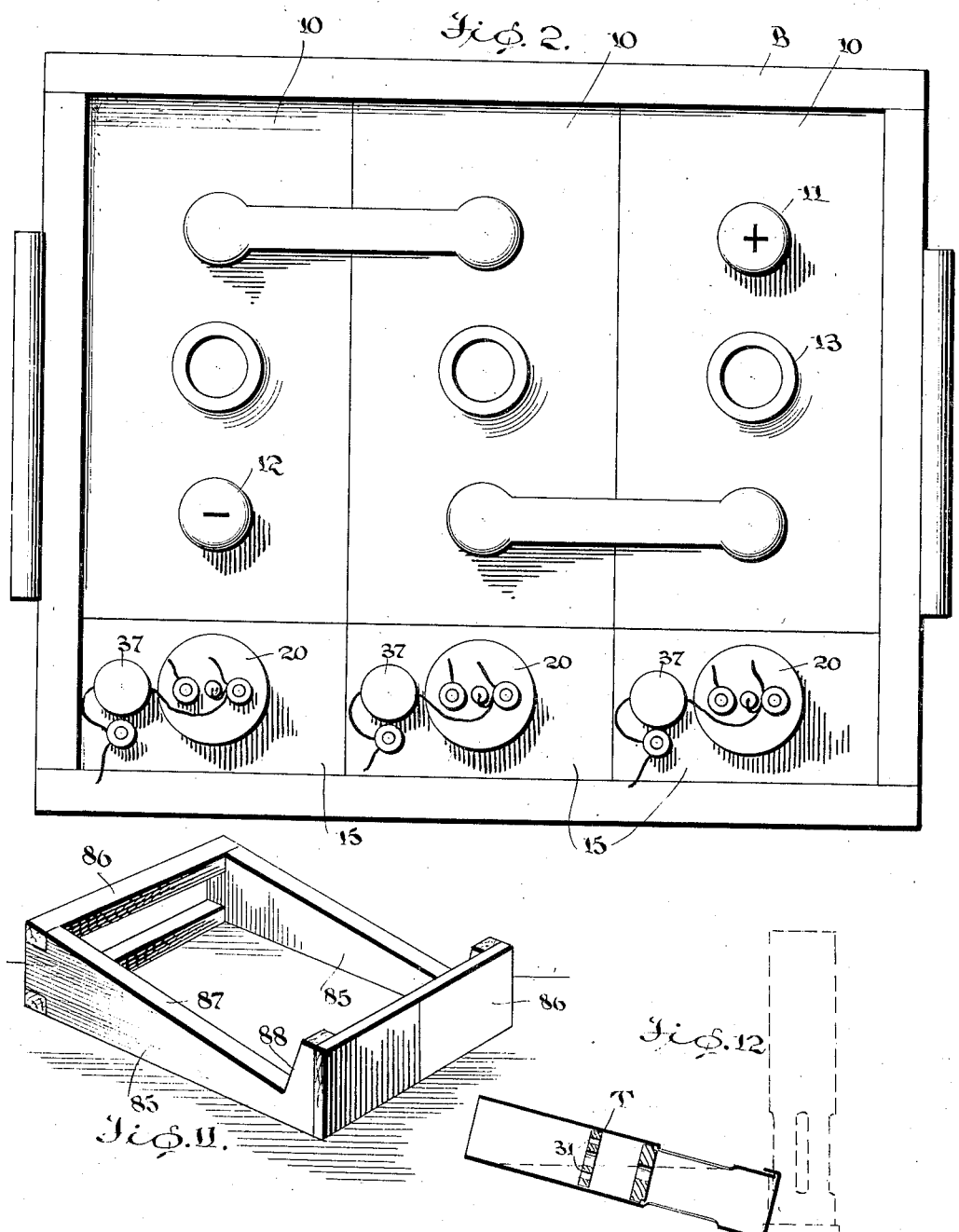
Figure 2 is a top plan view of a battery showing the invention applied.

It will be noted in Figures 2, 3 and 4 that the plates of each cell terminate in spaced relation with the one side of the battery box B or one end of the associated jar J. The plates are all of equal length and thus providing an equal space 14 in each end of the battery jars J. For this space there is provided a separate cover plate 15, said cover plate being so seated upon the upper end of the associated jar that an air tight sealing thereof may be had. Each cover plate 15 is provided with a central opening having a downwardly extending flange 16 occurring about the periphery thereof and adapted to receive a tube T. The tube T may be made of any desirable material that will withstand the action of acid used in storage batteries of this type and is preferably formed adjacent its lower end with a reduced portion 17 which is provided with a pair of diametrically opposed slots 18, said slots extending longitudinally of the tube as shown. The lower end of the tube is provided with a removable cap 19 which may be tightly fitted thereon.

The upper end of the tube is provided with a cap or plug 20 which is formed with an annular flange on its lower face as at 21, Figures 3 and 4, said flange being adapted to fit within the upper end of the tube T. Also the tube T may have its upper end formed with a flange as at 22 in order to hold the same against downward movement. The cover 20 is also provided with a nipple 23 extending downwardly therefrom which is adapted to receive a tube 24. The tube 24 is preferably of glass and its upper end extending slightly above the top surface of the cap or cover 20, while its lower end is received within the upper end of a tubular member 25, said tubular member 25 terminating at its lower end in a bulb 26. The lower end of the tube 24 is closed as at 25' and in the tube is placed a predetermined amount of mercury 26'. The member 25 should be freely slidable upon the member 24 and a tight fitting between the member 24 and the nipple 23 of the cap 20 should be made. The cap 20 in each instance also carries a pair of binding posts 27 and 28 respectively.

Within the tube T there is placed a partition member 29 through which the upper end of the member 25 is adapted to slide and immediately below the member 29 there is positioned a second partition wall 30. These members are shown in detail in Figure 12 of the drawings and as is seen the member 30 is of such diameter that liquid can pass therebetween and the inner walls of the tube T, while the partition 29 is provided with orifices 31 to enable liquid to pass therethrough. Both the members 29 and 30 serve as a guide for the members 24 and 25 and also serve a further purpose which will later be described. In the bulb 26 of the tube 25 there may be placed sand or the like as indicated at 41 for a purpose which will later be described.

The same construction as heretofore described relative to the tubular member T and associated parts is incorporated in each of the jars at one end thereof in the battery; and also each jar is provided with a float member generally indicated by the reference character F. This float member is positioned adjacent the tube T, in each instance, and is provided with a stem 33 which projects upwardly through a suitable orifice in a plug 35 threaded through the associated cover 15. This plug should be sealed that no air may enter. The head portion 36 of the plug 35 is hollow as shown and provided with a cap 37. In the bottom of this head portion there is provided a plate 38 through which the stem 37 passes and does not touch. The upper end of the stem 37 is connected to a wire 39 which in turn is led through a side wall of the head portion of the plug 35 and then connected to the binding post 27 through a wire 40, Figs. 1 and 3.

Figure 1:
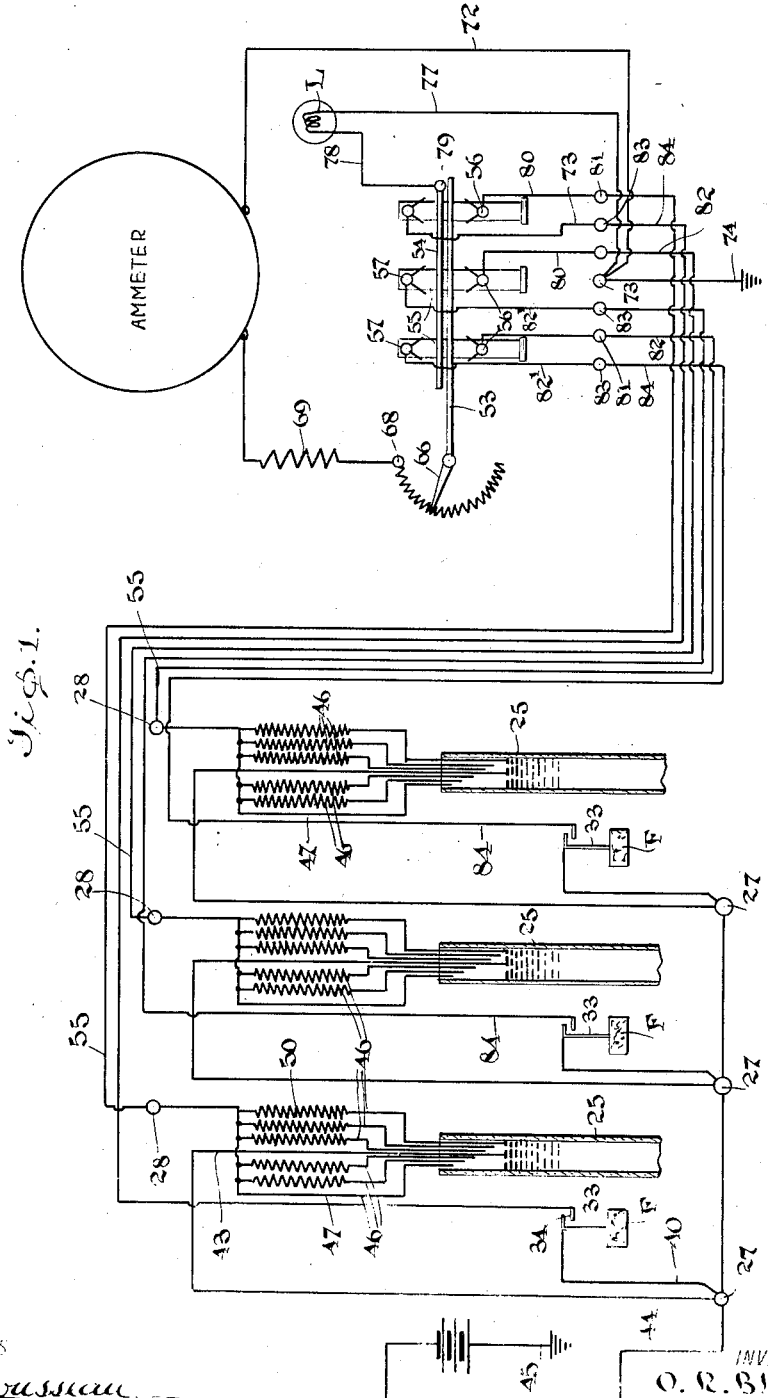
Figure 1 is a view illustrating diagrammatically the present invention when incorporated with a six volt storage battery of the electrolytic type.

As illustrated to advantage in Figure 1 of the drawings within the upper end of each of the tubular members 24 there is positioned a wire 43 having its lower and free end extending to a point slightly above the bulb 26 of tube 25. This wire is connected to the binding post 27 and the binding post 27 is in turn connected to the positive side of the battery through wire 44, while the negative side of the battery is connected to the ground as at 45.

Grouped about the wire 43 is a plurality of wires 46, preferably five in number, and a wire 47. The wires 46 and 47 terminate at their lower ends at different points within the tube or member 25, that is, one terminates above the other as shown. The wires 46 together with the wire 47 are wound upon a spool 48, said spool being supported upon the nipple 23 of the associated cover 20. Each of the wires 46 are so wound that they may offer a resistance to the flow of electric current, this resistance being indicated at 50 in Figure 1. The wire 47 is adapted to offer no appreciable resistance to a flow of electric current therethrough, that is, if this electric current is of a small amperage. The wires 46 and 47 are connected in parallel with each other and then connected to the binding post 28. This arrangement and construction is carried out for each of the cells of the battery as shown.

The structure of the apparatus and instrumentalities for indicating at a remote point the height of electrolyte within each cell of the storage battery and also the voltage of each cell of the storage battery is specifically shown in Figures 5 to 10 inclusive and diagrammatically shown in Figure 1. This apparatus is installed or embodied in one unit comprising a supporting plate P and a face plate P' which are connected together by the means of bolts or the like as at 52. The bolts 52 hold the plates P and P' in spaced relation, as shown, and also serve for securing the unit or instrument to a support such as the dash board or instrument board of a motor vehicle in case the present invention is associated with a storage battery on a motor vehicle. Upon the member P, as best shown in Figure 8, there is secured a pair of plates 53 and 54, one upon each side thereof and adjacent the lower end. The plates P and P' support for sliding movement a plurality of plungers 55, said plungers extending between the plates 53 and 54 of the supporting plate P and being three in number, one for each of the cells of the battery. Each plunger carries a pair of clips 56 and 57, the specfic construction of which is shown in Figure 9. Each clip comprises a body plate portion 58 provided with an opening 59 adapted to receive the one end of a screw bolt 60 which extends through the associated member 55. Each bolt also carries a washer 61 and a binding nut 62 whereby a terminal wire may be connected therewith. The member 58 has a tang 59' extending therefrom which terminates in a pair of divergent fingers 60'. A compression spring 62 is interposed between each of the clips 56 and 57 and plate P. Also a washer 63 is positioned between each clip 56 and 57 and the abutting end of the associated spring 62.

The one end of each member 55 is provided with a knob 64 which is preferably made of insulating material.

The electric lamp L is carried by the plate P. The member 53 has formed therewith a suitable extension 65 to which there is pivoted the one end of an arm 66, the free end of said arm being adapted to pass over a resistance coil 67 suitably mounted in a groove formed in the rear face of the plate P. The one end of resistance coil 67 is connected to a binding post 68, while its other end is free. The binding post 68 is connected to one end of an ammeter magnet coil 69 which is adapted to control the movement of a hand or pointer 70. The pointer 70 is adapted to move over a scale 71 which is graduated to indicate the voltage of the battery cell being tested with the pointer 70 passing thereover. The other end of the coil 69 is connected through a wire 72 with the binding post 73, the binding post 73 being grounded as at 74.

The electric lamp L extends between the plates P and P' and in register with an opening in the plate P which is provided with a transparent closure 75 preferably of colored glass or the like and upon which may be written the word "water." The light L has one of its terminals connected to the binding post 73 through a wire 77 and its other terminal connected through a wire 78 to the conductor member 54 as at 79, Figure 1.

Each of the clips 56 is connected through a wire 80 with a binding post 81 carried by the supporting plate P, and each binding post 81 is connected through a wire 82 to the binding post 28 of the associated battery cell as best shown in Figure 1. Each of the clips 57 is connected through a wire 82' to a binding post 83, and each binding post 83 is connected through a wire 84 to the float contact member 34 of the associated battery cell.

As shown in Figure 6, a casing indicated by the reference character 85 may be provided for enclosing the mechanism carried by the plate P and P' and if desired a rear face plate 86 may be provided for this casing.

Referring to Figure 11 of the drawings there is shown a rack or frame the purpose of which is to enable the fixing of original electrolyte level in a battery. The rack or frame comprises two side members 85 and two end members 86. The two side members 85 have their upper edges provided with a notch to form an inclined surface 87 and the shoulder 88. By placing a battery upon the rack the electrolyte within the cells will enter the tubes T. The division members 29 and 30 permit the electrolyte to flow upward into the tubes T. In Figure 12 the tube is shown in dotted lines when erect and in section when tilted. The last named position of the tube T would be assumed when placed upon the rack or frame shown in Figure 11. As heretofore described the tubes T are closed against entrance of air at the upper end wherefore the electrolyte can proceed upwardly within the tubes a limited distance due to the air trapped within the tubes causing sufficient pressure to prevent the electrolyte rising above a predetermined degree. By tilting the tubes as illustrated in the manner in Figure 12 it is insured that the electrolyte will rise within the tubes only to a predetermined height.

The operation of the present apparatus is as follows: Assuming that the battery has been tilted so that the electrolyte has proceeded upwardly into the tubes T the distance illustrated in Figure 3 of the drawings. Now it will also be assumed that the bulb 26 of the member 25 is so weighted that when the specific gravity of the electrolyte within the battery or cell within which the tube may be disposed is at its minimum, said tube will rest on the cap or closure 19. Upon the battery being charged and the electrolyte increasing its specific gravity then the bulb 26 will be forced upwardly. As the tubular member 25 rises the mercury 26′ will be brought into engagement with the lower end of the different wires 46 and 47 and upon the cell being tested becoming fully charged the lower end of each of the wires 46 and 47 will be immersed in the mercury. The greater the number of wires 46 and 47 immersed in the mercury 26′ the less the resistance offered to the flow of current through said wires.

Assuming that it is desired to know the charge of a cell of the storage battery with which the invention is associated, then the proper thing to do is push upon the member 55 associated with that particular cell. Upon moving forward this member a certain degree its clip 57 will come in contact with the plate 53 whereupon the circuit through the ammeter is closed and the pointer 70 will move to indicate the amount of voltage to that particular cell. The course of the current for operating the ammeter is as follows: From the positive side of the battery to the terminal post 27, from thence to the wire 43 of the cell being tested and then upwardly through one or more of the wires 46 and 47, and to the terminal posts 28. From this post the current proceeds to the clip member 56 and then through the resistance 67 through the ammeter coil 69 and to the binding post 73 and from thence to the ground and return to the negative plates of the battery. This operation is true for each of the different cells that may be tested and it is believed from the description given it is obvious that extremely accurate measurements of the voltage of each cell may be obtained.

Should the operator desire to know whether or not the electrolyte within each cell has fallen below the battery plates, then he should draw rearwardly upon the reciprocating member 55 of each cell at different intervals. Upon drawing the member 56 rearwardly its clip 57 will come in contact with the plate or conducting member 53 and if the float F of the associated cell has dropped a sufficient degree so that its stem 37 will contact with the associated plate 34 then an electric circuit will be established through the light L then the same will be energized. This will notify the operator that this particular cell is in need of water in order to cover the plates therein and prevent the same from sulphating. The electric current during this operation proceeds as follows: From the positive side of the battery the current proceeds to the binding post 27, from thence to the stem 33 of float F, and if this stem is resting upon contact plate 34 the current proceeds through this plate to the binding post 83. From the binding post 83 the current proceeds to clip 57 and from thence through the light L to the grounded side of the battery.

It is to be pointed out that a battery constructed in accordance with the present invention may be used without the indicating means for determining the height of the electrolyte and voltage for each cell. This may be done by simply lifting out the tubes T together with the cover plates 15 and substituting other cover plates and possibly a small amount of sulphuric acid in order to again fill the cells with the proper amount of electrolyte.

It is also important to note that the scale 71 of the ammeter should be properly graduated and that the ammeter coil 69 is properly made so that it may move the pointer 70 to give the correct indications upon the dial 71.

I claim:—

1. In a specific gravity testing device, a tube, a plug in one end of the tube, a coil supported within the tube by said plug, said coil comprising a plurality of wires each constituting an appreciable resistance to the flow of an electric current and all connected at one end to a terminal carried by the plug, and the remaining ends extending into the tube and terminating in step relation, a float within the tube carrying an upwardly extending tube with a column of current conducting liquid therein, said last named tube being adapted to receive the extending portions of said resistance wires and the current conducting liquid electrically connecting the wires with the upward movement of the float thereby successively connecting said resistance wires in parallel and decreasing the resistance thereof to a flow of electric current in a circuit in which the same may be interposed.

2. In a specific gravity testing device, a tube, a plug in one end of the tube, a coil supported within the tube by said plug, said coil comprising a plurality of wires all of which have one end connected to a terminal carried by the plug and the remaining ends extending into the tube and terminating in step relation, and all of the wires excepting the wire with its free end extending the least distance within the tube, having an appreciable resistance to the flow of an electric current, a float within the tube carrying an upwardly extending tube having a column of mercury therein, said last named tube being adapted to receive the extending portions of the wires constituting the coil, thereby permitting the free and extending ends of said wires to be electrically connected by the mercury with the upward movement of the float and in this way permit the resistance wires of the coil to be connected in parallel in a successive order, and the wire of least resistance brought into parallel connection last whereby the resistance of an electrical circuit in which said coil may be connected may be gradually decreased and lastly reduced to a minimum.

3. In a specific gravity testing device, a tube, a plug in one end of the tube, a coil supported within the tube by said plug, said coil comprising a plurality of wires each constituting an appreciable resistance to the flow of an electrical current, and all connected at one end to a terminal carried by the plug and the remaining ends thereof extending within the tube and terminating in step relation, a float within the tube carrying an upstanding tube having a column of mercury therein, said float tube being adapted to freely receive the extending ends of said resistance wires, a second terminal carried by the plug, and a wire extending from the second terminal into the float tube and terminating beneath the lowermost of the extending ends of said resistance wires.

OSCAR R. BLATTER.